Jan. 11, 1966 J. CLARE 3,228,722
SUNSHADE SUPPORT ASSEMBLY
Filed Aug. 12, 1963
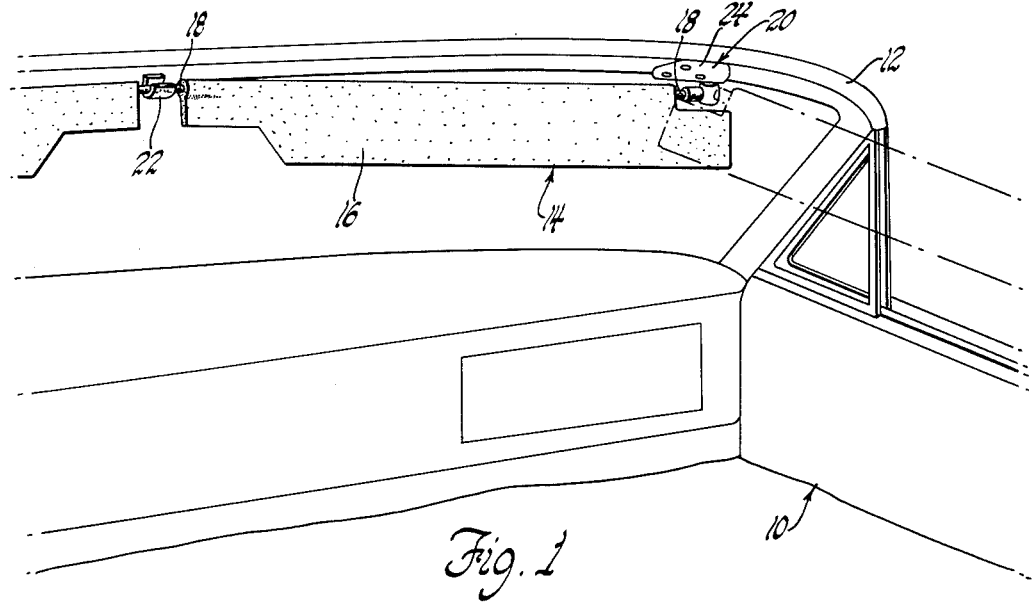
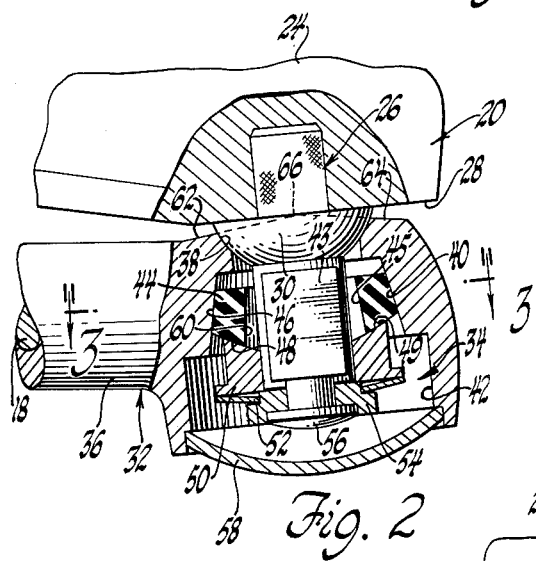
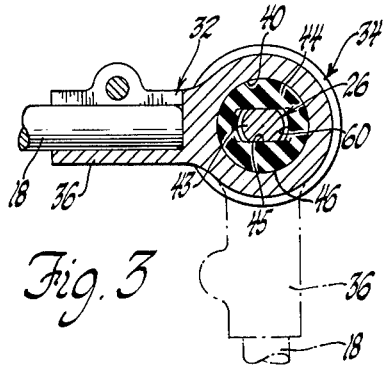
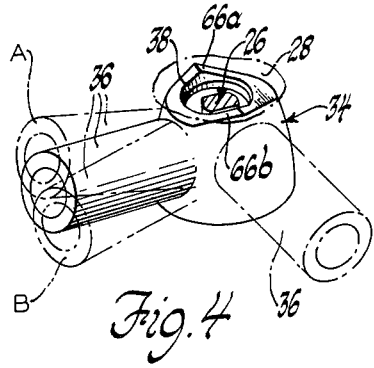
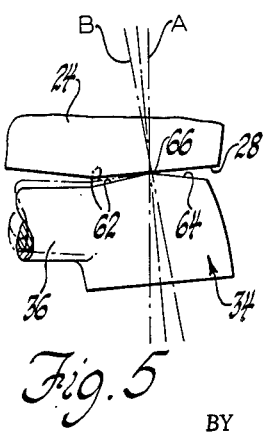
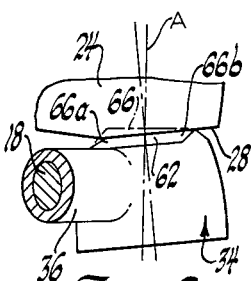
INVENTOR.
John Clare
BY
W. S. Pettigrew
ATTORNEY

United States Patent Office 3,228,722
Patented Jan. 11, 1966

3,228,722
SUNSHADE SUPPORT ASSEMBLY
John Clare, Fraser, Mich., assignor to General Motors Corporation, Detroit, Mich., a corporation of Delaware
Filed Aug. 12, 1963, Ser. No. 301,567
10 Claims. (Cl. 296—97)

This invention relates to vehicle body sunshades and more particularly to vehicle body sunshade support assemblies.

It is well-known to provide a sunshade support assembly for swingably mounting the sunshade on a vehicle body for generally planar movement to various selected positions thereof relative to the body, and for limited movement laterally of its normal plane of movement so as to be engaged within or removed from a sunshade retaining hook. This provision for lateral movement of the sunshade presents difficulties in that the sunshade is also laterally movable from some selected position other than adjacent the retaining hook, as for example, under the forces of wind when it is adjacent an open window, thus requiring constant readjustment of the sunshade to its original selected position. The sunshade suport of this invention overcomes these difficulties in that the sunshade is permitted to move laterally of its normal plane of movement only when it is located in a predetermined position, as for example, adjacent the retaining hook.

The primary object of this invention is to provide an improved sunshade support assembly. Another object of this invention is to provide an improved sunshade support assembly mounting the sunshade on the body for generally planar movement relative thereto and limited movement laterally of its normal plane of movement only when in a predetermined position. A further object of this invention is to provide an improved sunshade support assembly mounting the sunshade on the body for movement in any selected one of a plurality of planes between a stored position adjacent the vehicle body windshield and an operative position adjacent the vehicle body side window, with the sunshade being movable from one selected plane to another only when it is located in stored position. Yet another object of this invention is to provide an improved vehicle body sunshade support assembly swingably mounting the sunshade on the body for generally planar movement relative thereto and movement laterally of its normal plane, with means being provided for automatically returning the sunshade to its normal plane upon swinging movement thereof from its laterally located position.

These and other objects of the invention will be readily apparent from the following specification and drawings wherein:

FIGURE 1 is a fragmentary perspective view of a convertible vehicle body embodying a sunshade support assembly according to this invention;

FIGURE 2 is an enlarged partially broken away view of a portion of FIGURE 1;

FIGURE 3 is a sectional view taken generally along the plane indicated by line 3—3 of FIGURE 2;

FIGURE 4 is a perspective view;

FIGURE 5 is a view indicating the provision for lateral movement of the sunshade and showing the support assembly in stored position; and FIGURE 6 is a view similar to FIGURE 5 showing the support assembly in a position intermediate stored and operative positions.

Referring now particularly to FIGURE 1 of the drawings, a convertible vehicle body 10 includes a windshield header 12 of conventional structure. A sunshade assembly 14 includes a sunshade or visor 16 swingably mounted in conventional manner on a mounting shaft 18. The one or outboard end of shaft 18 is secured to a sunshade support assembly 20 according to this invention to mount the sunshade on header 12 for swinging movement relative thereto, and the other or inboard end of shaft 18 projects from the visor 16 and is received within a retaining hook 22 of header 12 to locate the sunshade assembly in a normal or stored position adjacent the header.

As shown best in FIGURE 2, assembly 20 includes a support bracket 24 bolted to header 12 and provided with a depending pivot shaft 26. The bracket is further provided with a generally horizontal bearing surface 28 normal to shaft 26 and merging with a ball portion 30 thereof. A sunshade pivot member 32 includes a socket 34 receiving the shaft 26, and a horizontally extending split sleeve 36 receiving the outboard end of shaft 18 and secured thereto in conventional manner.

Socket 34 includes an upper ball seat 38 mating with ball portion 30, and a tapered or frusto-conical bore or pivot surface 40 merging with a lower cavity 42. As seen best in FIGURE 3, shaft 26 includes a double D-shaped portion 43 which is slidably and nonrotatably received within a complementary shaped bore 45 in an alignment or mounting member 44 having an outer pivot surface 46 complementary to pivot surface 40. The member 44 thus mounts member 32 for rotation about shaft 26. It is preferably fabricated of nylon or other plastic material to provide for self-lubrication and wear resistance against friction between the engaging pivot surfaces 40 and 46.

Member 44 is further provided with a lower semispherically shaped surface 48 engaging a complementary surface 49 of a seating member 50 slidably received on portion 43 of shaft 26. A Belleville washer 52 seats between member 50 and a shouldered washer 54 on a header over portion 56 of shaft 26. The washer 52 maintains surfaces 48 and 49 in engagement, maintains the two pivot surfaces 40 and 46 in close engagement, and further resists movement of member 32 axially of shaft 26. A decorative cap 58 closes cavity 42 to conceal socket 34 from view.

The sunshade assembly 14 and member 32 may be rotated as a unit relative to member 44 and shaft 26 so that the sunshade may be located in any desired position between the stored and operative positions indicated respectively in full and broken lines in FIGURE 1. The sunshade assembly is, of course, oriented by the shaft 26 to move in a generally horizontal plane normal to the axis of the shaft. It is, however, necessary that there be some provision for permitting movement of the sunshade assembly laterally out of this horizontal plane when it is located adjacent header 12 so that the inboard end of shaft 18 may be selectively installed within retaining hook 22 or removed therefrom.

As shown best in FIGURE 2, the double D-shaped bore 45 of member 44 includes oppositely tapering end surfaces 60 to allow members 44 and 32 to rock vertically as a unit generally in a plane coplanar with the longitudinal plane of symmetry of the bore 45 and relative to the ball surface 38 and the semispherical surface 49. A pair of obliquely convering planar surfaces 62 and 64 on member 32 are engageable with surface 28 of the bracket when the member is rocked and define a pair of limit positions "A" and "B", FIGURE 4, limiting the range of rocking movement of member 32.

As seen best in FIGURE 3, bracket 24 is installed so that the longitudinal plane of symmetry of the bore 45 is generally parallel with header 12, such that the sunshade assembly is movable laterally of its normal plane only when it is in its stored position adjacent the header 12. Once the sunshade assembly is removed from the retaining hook 22, returned to its normal plane and then moved toward its operative position, indicated in broken lines in FIGURE 3, it is not possible for it to move from its horizontal plane since any vertical pressure applied to the sunshade is resisted by the abutting flatted portions of shaft portion 43 and bore 45. Thus it is not possible for the sunshade to move laterally of its normal horizontal plane from a selected position therein, as for example, under the forces of wind when adjacent an open side window.

As mentioned previously, this invention includes means for automatically returning the sunshade to its normal horizontal plane upon swinging movement thereof from a laterally located position. Referring now to FIGURES 2, 4, 5 and 6, the obliquely converging planar surfaces 62 and 64 form a knife-edge 66 which is generally normal to the axis of shaft 26. From an examination of FIGURES 2 and 4, it will be apparent that knife-edge 66 is capable of freely moving relative to surface 28 of the bracket only when member 32 is located generally coaxially with shaft 26. Should the sunshade assembly 14, member 32 and member 44 be moved laterally from stored position in the normal horizontal plane to position "A" in FIGURE 4, for example, a corresponding shift of the common axis of the engaging pivot surfaces 44 and 46 to the attitude "A," indicated in FIGURE 5, will result. It will readily be seen that knife-edge 66 is incapable of moving in the plane normal to the adjusted axis "A" due to the oblique relationship between this plane and the plane of surface 28 which abuts the knife-edge. If, therefore, member 32 were rotated while in such an attitude rather than being manually returned to its normal horizontal plane, the portion 66a of the knife-edge would tend to dig upwardly into surface 28. Thus, upon initial rotation of member 32 about axis "A" toward the operative position of the sunshade, the interaction between portion 66a of the knife-edge and surface 28 tends to cam the one side of members 32 and 44 axially downwardly of shaft 26, indicated in FIGURE 6. Washer 52 resists such axial movement and exerts a centering action on seating member 50 such that, as the sunshade is moved toward the vehicle body side window, the camming force between the knife-edge and surface 28 acts to slide members 32 and 44 over the semispherical surface 49 of the seating member and back into coaxial relation with shaft 26. The sunshade is thus automatically returned to its normal horizontal plane of movement. It will be apparent that the same result would be achieved if member 32 were initially moved to position "B" of FIGURES 4 and 5, wherein the camming interaction would take place between portion 66b and surface 28 upon rotation of the member toward the operative position.

It is to be noted that the above-described provision for movement of the sunshade assembly laterally of its normal horizontal plane when in stored position may be additionally employed as a means of vertical adjustment of the sunshade in that the sunshade assembly and member 32 may be rotated from a laterally adjusted position adjacent header 12 in any selected one of a plurality of planes contained between those defined by the engagement of end surfaces 60 with shaft portion 43. This may easily be accomplished by removing the planar surfaces 62 and 64 from member 32 and providing instead a mere flat surface contiguous with the upper edge of sleeve 36, and spaced from surface 28 of the bracket. With such a modification, no resistance is offered to rotation of the sunshade assembly within some selected plane containing the position to which the sunshade assembly is vertically adjusted when adjacent header 12.

Thus a new and improved vehicle body sunshade support assembly is provided.

I claim:

1. In a vehicle body, a sunshade support assembly comprising, in combination, a sunshade support member, means mounting said member on said body for generally planar movement between a stored position adjacent a body member and an operative position adjacent a vehicle body window, means operative in the stored position of said support member to permit movement of said member out of its normal plane of movement to a position to one side thereof, and means operative upon movement of said support member from said position to one side of said plane toward said window to return said member into said plane.

2. The combination recited in claim 1 wherein said last mentioned operative means includes cooperative camming means on said vehicle body member and said support member being engageable upon movement of said support member from said position to one side of its normal plane of movement toward said window.

3. In a vehicle body, a sunshade support assembly comprising, in combination, a sunshade support member, means mounting said member on said body for movement in any selected one of a plurality of planes of rotation between a stored position adjacent a vehicle body window and an operative position adjacent a second vehicle body window, means operative in a predetermined position of said member in the one selected plane of movement to permit movement of said member out of the one selected plane to another selected plane of movement, and means preventing movement of said member out of the one selected plane of movement from a position therein other than said predetermined position.

4. In a vehicle body, a sunshade support assembly comprising, in combination, a sunshade support member, means mounting said support member on said body for generally planar movement between a stored position adjacent a vehicle body member and an operative position adjacent a vehicle body window, means operative in the stored position of said member to permit movement thereof out of its normal plane of movement to a position to one side thereof, said operative means preventing movement of said member out of said plane from any position therein other than said stored position, and means operative upon movement of said member from said position to one side of said plane toward said window to return said member into said plane.

5. In a vehicle body, a sunshade support assembly comprising, in combination, a sunshade support member, means mounting said support member on a vehicle body member for generally planar movement between a stored position adjacent said body member and an operative position adjacent a vehicle body window, means operative in the stored position of said support member to permit movement of said support member out of its normal plane of movement to a position adjacent said body member in another selected plane of movement, camming means on said support member and said body member engageable upon movement of said support member from said stored position thereof in said other selected plane toward said window to move said support member out of said other selected plane, and resilient means operative upon operation of said camming means to return said support member to said normal plane of movement thereof.

6. In a vehicle body, a sunshade support assembly comprising, in combination, a vehicle body member including a pivot shaft thereon, a sunshade support member, means mounting said support member on said pivot shaft for rotation thereabout in any selected one of a plurality of planes of rotation between a stored position adjacent said body member to an operative position adjacent a vehicle body window, means on said mounting means and said pivot shaft being cooperative upon movement of said support member to said stored position in said selected plane of rotation to permit movement of said support member and said mounting means as a unit to a position of said support member in another selected plane of rotation, said cooperative means preventing movement of said support member out of said first selected plane of rotation from a position therein other than said stored position.

7. In a vehicle body, a sunshade support assembly comprising, in combination, a support bracket mounted on said body and including a pivot shaft, a sunshade support member having a bore therein, an alignment member rotatably received within said bore and nonrotatably received on said pivot shaft to mount said support member on said pivot shaft for generally planar movement thereabout between a stored position adjacent a vehicle body windshield and an operative position adjacent a vehicle body side window, and cooperative means on said alignment member and said pivot shaft being operative upon movement of said support member to a predetermined position relative to said body to permit movement of said support member out of said plane of movement thereof to a position to one side of said plane, said cooperative means preventing movement of said support member out of said plane of movement thereof from a position of said support member therein other than said predetermined position.

8. In a vehicle body, a sunshade support assembly comprising, in combination, a support bracket mounted on said body and including a pivot shaft, a sunshade support member including a bore therein, an alignment member rotatably mounted in said bore, means nonrotatably mounting said alignment member on said pivot shaft to mount said support member on said pivot shaft for generally planar movement about the axis thereof between a stored position adjacent a vehicle body windshield and an operative position adjacent a vehicle body side window, said nonrotatable mounting means permitting rocking movement of said support member and said alignment member as a unit relative to the pivot shaft axis from said stored position to a position to one side of the normal plane of movement of said support member, cooperative camming means on said support member and said mounting bracket engageable upon movement of said support member from said position to one side of said plane toward said side window to cam said support member generally axially of said pivot shaft and toward said plane, and resilient means resisting axial movement of said support member and cooperating with said camming means to return said support member into said plane.

9. In a joint for connecting a pair of members for movement relative to each other, the combination comprising, a pivot shaft on one of said members, a mounting member, means nonrotatably mounting said mounting member on said shaft, means rotatably mounting the other of said members on said mounting member for generally planar movement of said other member about said pivot shaft, and cooperative means on said shaft and said mounting member operative to permit rocking movement of said other member and said mounting member as a unit out of said plane of movement of said other member upon movement of said other member to a predetermined position relative to said one member, said cooperative means preventing said rocking movement upon movement of said other member to any position other than said predetermined position.

10. In a joint for connecting a pair of members for movement relative to each other, the combination comprising, a pivot shaft on one of said members having a portion of generally rectangular section, a mounting member having an elongated generally rectangular bore complementary to said pivot shaft portion in one dimension thereof so as to be nonrotatably received thereon, means rotatably mounting the other of said members on said mounting member for generally planar movement about said pivot shaft, said bore being elongated and of greater extent in the other dimension thereof than said pivot shaft portion to permit rocking movement of said other member and said mounting member as a unit relative to the axis of said pivot shaft, and out of said plane of movement of said other member.

References Cited by the Examiner
UNITED STATES PATENTS

| 1,717,185 | 6/1929 | Caldwell | 296—97 |
| 2,328,360 | 8/1943 | Rigoulot | 287—21 |
| 2,939,741 | 6/1960 | Keating et al. | 296—97 |

BENJAMIN HERSH, *Primary Examiner.*

A. HARRY LEVY, *Examiner.*